United States Patent
Le Gall et al.

(10) Patent No.: US 10,147,920 B2
(45) Date of Patent: Dec. 4, 2018

(54) ENERGY STORAGE MODULE INCLUDING A PLURALITY OF ENERGY STORAGE ASSEMBLIES

(71) Applicant: Blue Solutions, Ergue Gaberic (FR)

(72) Inventors: Laurent Le Gall, Ergue Gaberic (FR); Anne-Claire Juventin, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 264 days.

(21) Appl. No.: 15/038,023

(22) PCT Filed: Nov. 19, 2014

(86) PCT No.: PCT/EP2014/075059
§ 371 (c)(1),
(2) Date: May 19, 2016

(87) PCT Pub. No.: WO2015/075092
PCT Pub. Date: May 28, 2015

(65) Prior Publication Data
US 2016/0301047 A1    Oct. 13, 2016

(30) Foreign Application Priority Data

Nov. 22, 2013  (FR) .................................... 13 61535

(51) Int. Cl.
*H01M 2/10* (2006.01)
*H01M 2/20* (2006.01)
(Continued)

(52) U.S. Cl.
CPC ............ *H01M 2/1077* (2013.01); *H01B 3/30* (2013.01); *H01G 2/106* (2013.01); *H01M 2/105* (2013.01);
(Continued)

(58) Field of Classification Search
CPC ...... H01M 2/105; H01M 2/1077; H01M 2/10; H01M 2/347; H01M 2/34; H01M 2/344
See application file for complete search history.

(56) References Cited

U.S. PATENT DOCUMENTS 4,206,273 A * 6/1980 Mandil ................. H01M 2/344
429/65
5,985,480 A * 11/1999 Sato ....................... H01M 2/206
429/158
(Continued)

FOREIGN PATENT DOCUMENTS

EP          1109237      6/2001
WO      WO-9531012      11/1995

OTHER PUBLICATIONS

International Search Report with English Language Translation, dated Apr. 9, 2015, Application No. PCT/EP2014/075059.
(Continued)

*Primary Examiner* — Carlos Barcena
(74) *Attorney, Agent, or Firm* — Womble Bond Dickinson (US) LLP

(57) ABSTRACT

The invention relates to an energy storage module (10) comprising a plurality of energy storage assemblies (100) positioned side by side, and a rigid enclosure (12) intended for surrounding the storage assemblies, each assembly including at least one side wall closed at each end by an end surface, wherein the storage assemblies are electrically connected in pairs by conductive strips (110) extending over at least one end surface of each assembly, the strips being arranged such that one strip connects a first end surface of at least one predetermined assembly to an end surface of a first adjacent assembly and a second strip connects a second surface of the predetermined assembly to an end surface of a second adjacent assembly. The module also includes at least one electrically insulating member (120), made of an (Continued)

Figure 1:
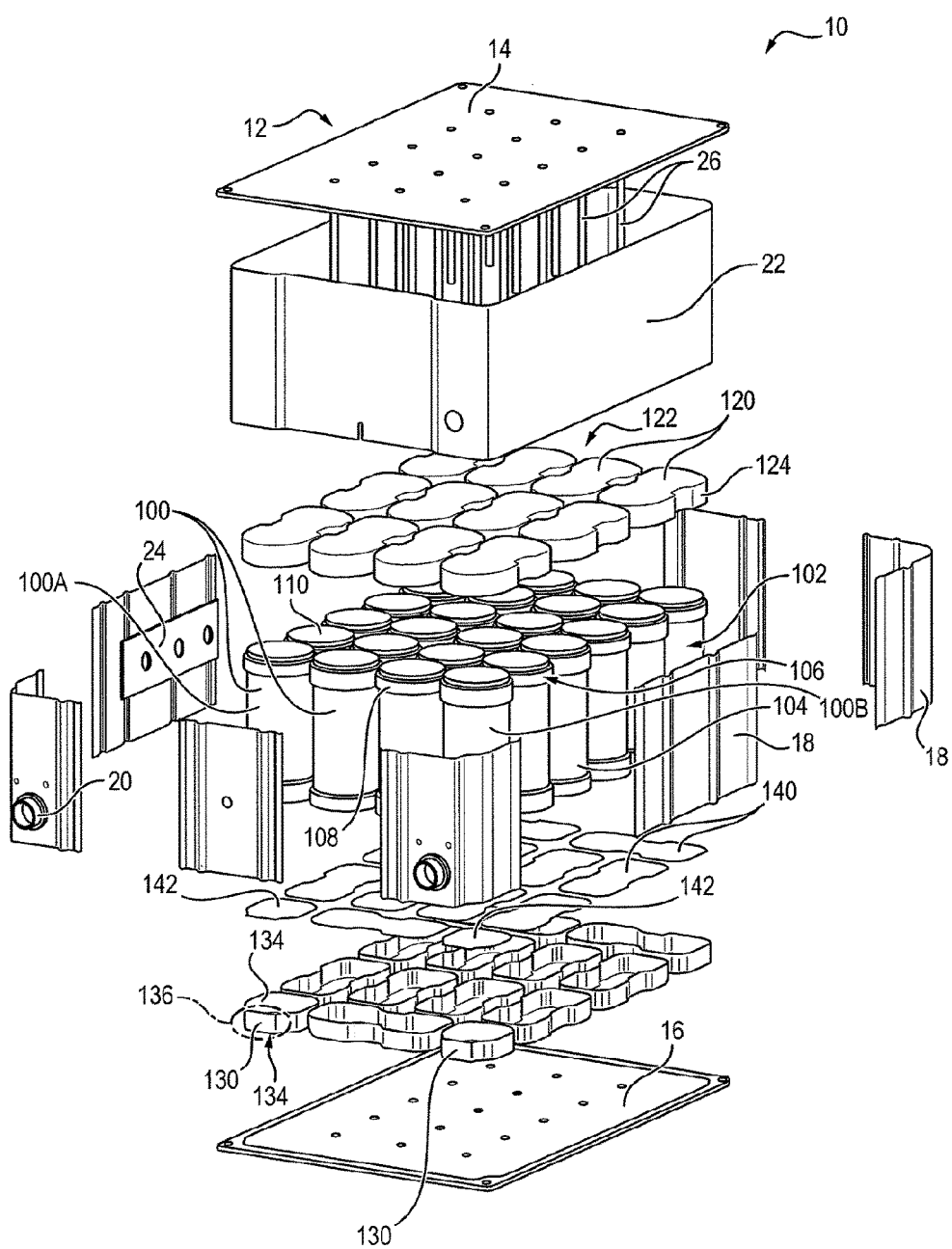

electrically insulating material and comprising a bottom (122) and a rim (124) extending essentially perpendicular to the bottom and surrounding same, each electrically insulating member (120) being associated with a strip (110) and fitted onto the end surfaces of two adjacent assemblies connected by the strip such that the bottom is parallel to the end surfaces and the rim runs alongside the side walls of the two assemblies while overlapping same over at least a portion of the height thereof.

13 Claims, 2 Drawing Sheets

(51) Int. Cl.
    *H01G 2/10*     (2006.01)
    *H01B 3/30*     (2006.01)
    *H01M 10/653*     (2014.01)

(52) U.S. Cl.
    CPC ......... *H01M 2/1094* (2013.01); *H01M 2/204* (2013.01); *H01M 2/206* (2013.01); *H01M 10/653* (2015.04)

(56) References Cited

U.S. PATENT DOCUMENTS

| | | | | |
|---|---|---|---|---|
| 2001/0010878 | A1* | 8/2001 | Nakanishi | H01M 2/105 |
| | | | | 429/120 |
| 2009/0233163 | A1* | 9/2009 | Fang | H01M 2/1022 |
| | | | | 429/99 |
| 2010/0081048 | A1 | 4/2010 | Nansaka et al. | |
| 2010/0129703 | A1* | 5/2010 | Caumont | H01G 2/04 |
| | | | | 429/120 |
| 2011/0293998 | A1* | 12/2011 | Sato | H01M 2/1077 |
| | | | | 429/159 |
| 2013/0323558 | A1* | 12/2013 | Darch | H01M 2/105 |
| | | | | 429/98 |
| 2014/0178723 | A1* | 6/2014 | Tsujioka | H01M 2/12 |
| | | | | 429/72 |
| 2015/0037657 | A1* | 2/2015 | Hu | H01M 2/202 |
| | | | | 429/158 |

OTHER PUBLICATIONS

French Search Report, dated Aug. 28, 2014, French Application No. 1361535.

\* cited by examiner

ENERGY STORAGE MODULE INCLUDING A PLURALITY OF ENERGY STORAGE ASSEMBLIES

The invention has as its object an energy storage module, including a plurality of energy storage assemblies.

Such a module generally includes the plurality of energy storage assemblies positioned side by side in a rigid shell designed to surround the storage assemblies. Each assembly includes at least one side wall closed at each end by an end face and the storage assemblies are electrically connected two by two by conducting bars extending over at least one end face of each assembly. The assemblies are thus electrically connected in series, the bars are more particularly arranged so that a first bar connects a first end face of at least one predetermined assembly to an end face of a first adjoining assembly and that a second bar connects a second face of the predetermined assembly to an end face of a second adjoining assembly. All the assemblies are electrically connected in this manner with the exception of two assemblies which are respectively connected to a single adjoining assembly on the one hand, and to an output terminal (respectively positive or negative) of the module on the other hand.

The assemblies being connected in series and therefore not being at the same potential as the adjoining assemblies (with the exception of the end faces interconnected by a conducting bar), it is necessary to electrically insulate them one from the other. To accomplish this, an insulation plate positioned in the bottom of the module so as to abut an inner face of a wall of the shell is known in the state of the art. This insulation plate is generally made of a thermally conducting and electrically insulating material and includes an accommodation for each assembly, the accommodations being separated by spacers making it possible to avoid any contact between the adjoining assemblies.

Such a plate is generally made of EPDM, which is a rather expensive material but is the only one which makes it possible to obtain sufficient insulation. The forming of this material is also expensive, particularly because its conformation makes it necessary to use a plate of considerable thickness. It is therefore sought to reduce the costs of manufacture associated with the module, and particularly with the insulating function thereof.

The invention makes it possible to fulfill the aforementioned objective, to with perfecting a storage module which has both good performance from an electrical insulation standpoint but is also less costly than in the prior art.

To this end, the invention has as its object an energy storage module comprising a plurality of energy storage assemblies positioned side by side, and a rigid shell designed to surround the storage assemblies, each assembly including at least one side wall closed at each end by an end face, wherein the storage assemblies are electrically connected two by two by conducting bars extending over at least one end face of each assembly, the bars being arranged so that a bar connects a first end face of at least one predetermined assembly to an end face of a first adjoining assembly and that a second bar connects a second face of the predetermined assembly to an end face of a second adjoining assembly. The module also includes at least one electrical insulation member, made of an electrically insulating material and including a bottom and a rim extending essentially perpendicularly to the bottom and surrounding it, each electrical insulation member being associated with a bar and fitted on the end faces of the two adjoining assemblies connected by the bar so that the bottom is parallel to the end faces and the rim runs along the side walls of the two assemblies, straddling them over at least a portion of their height.

In this manner, the end faces constituting the terminals of the assemblies at a particular potential are insulated from the other assemblies at different potentials by the electrical insulation member, due to the presence of a spacer of electrically insulating material formed by the rim of the member between the adjoining assemblies not at the same potential. The member also insulates the assemblies from the rigid shell through its bottom.

It is then possible to eliminate the insulation plate as described above or to retain it for reasons of thermal conductivity, while considerably simplifying it, the thickness of said plate and its shape no longer being subject to the same constraints as in the prior art due to the presence of electrical insulation members. The costs of manufacture relating to this plate are therefore eliminated or at least considerably reduced and the costs of the electrical insulation members, which can be made of a less costly material, are less than the savings achieved on the costs connected with the insulation plate. Indeed, due to the fact that it surrounds only two assemblies, the electrical insulation member is in fact of simple design and economical to manufacture.

In addition, thanks to the rim of the electrical insulation member, this member forms a bowl which makes it possible to collect liquids. Thus in the event of a failure in an energy storage assembly, which causes an electrolyte leak, the electrolyte is contained in the bowl-shaped member and does not generate any leakage of current outside the periphery delimited by the member. This therefore does not generate a short-circuit in the module, which therefore improves the safety of the module.

The module according to the invention can also include one or more features of the following list:

the module includes at least one assembly connected to one of its end faces to an output terminal of the module by an output connector, the module further comprising at least one additional electrical insulation member associated with the output connector, made of an electrically insulating material and including a bottom and a rim extending essentially perpendicularly to the bottom and surrounding it, the additional electrical insulation member being fitted to the end face of the assembly connected to the output terminal so that the bottom is parallel to said end face and the rim runs along the side wall of the assembly while straddling it over at least a portion of its height. The assemblies located at the ends of the assemblies in series are thus respectively linked to the terminals of the module are connected to another assembly only at one of their end faces. The end face connected to the output terminal is, however, insulated from the other assemblies and from the shell by means of an electrical insulation member, this having a slightly peculiar shape, in particular, the output connector is configured in the shape of an L, a first wall of the connection running along the end face of the assembly and a second perpendicular wall carrying the output terminal, the additional electrical insulation member being configured to surround the assembly and the output connector so that its rim runs along the side wall of the assembly and the second wall of the connector, in this case, the rim of the additional electrical insulation member is configured so that it does not straddle the output terminal, which makes it possible to connect it more easily to the outside, the module includes a total number of insulation members greater than half the number of storage assemblies of the module, particularly equal to the number of assemblies of the module plus 1. In the first case, it is possible at a minimum to insulate all the assemblies from one another and limit as much as possible the costs of manufacture. The insulation with respect to the shell is then accomplished at least partly by another element of the module, particularly an insulation plate as already mentioned. In the second case, an electrical insulation member is associated with each of the bars and each of the connectors, which makes it possible to maximize safety in the module and to also attribute the function of insulating the assemblies with respect to the shell to the electrical insulation members, the or at least one of the insulating members, preferably each insulating member, is made of plastic, particularly a thermoplastic material such as polypropylene. The insulating and forming properties of such a material make it in fact an ideal material for creating the member. It can in particular be manufactured by thermoforming, a simply and cheap process.

a plate made of a thermally insulating material, made in particular of EPDM, is interposed between the bar or the output connector and the electrical insulation member. This embodiment is particularly advantageous. In fact, on the one hand, even if a plate allowing an improvement to the insulation is used, the quantity of the insulation plate used, and therefore the costs of manufacture, are limited. On the other hand, crackling due to partial discharges of the storage assembly in the member is avoided, due to the empty space which can be present between the two. The electrical insulation member being in fact rigid, it cannot generally completely adopt the shape of the assemblies while the insulation plate, which is much more flexible, can do this more easily. It has therefore been noted that such a module architecture would make it possible to avoid crackling in the module. Otherwise, as indicated, a plate can be interposed between the electrical insulation member and the shell, at least one assembly including a tubular element including the side wall(s) and open at at least one of its ends, and a cover forming an end face of the assembly and capable of closing the, or one end of the tubular element. The tubular element has more particularly but not exclusively a circular cross-section, in this case, preferably, the cover includes a wall forming the end face and a skirt surrounding said wall and surrounding the side wall(s) of the tubular element. The rim of the electrical insulation member then particularly has a height greater than or equal to the height of the skirt of the cover of the assembly. By covering only the skirt of the cover which has a diameter greater than the rest of the assembly, it is in fact certain that the adjoining assemblies will not come into contact. As the case may be, the rim covers the assembly over a portion preferably less than 20% of its height so as to ensure good insulation while minimizing the manufacturing costs of the electrical insulation members, The invention also has as its object a method for manufacturing an energy storage module comprising a plurality of energy storage assemblies positioned side by side and a rigid shell designed to surround the storage assemblies, each assembly including at least one side wall and closed at each end of the side wall by an end face, the method including the following steps:

the storage assemblies are electrically connected two by two through conducting bars extending respectively over at least one end face of each assembly, so that one bar connects a first end face of at least one predetermined assembly to a first adjoining assembly and a second bar connects a second face of the predetermined assembly to a second adjoining assembly, at least one electrical insulation member, made of an electrically insulating material and including a bottom and a rim extending essentially perpendicularly to the bottom and surrounding it on the end faces of the two adjoining assemblies connected by the bar so that the bottom is parallel to the end faces and the rim runs along the side walls of the two assemblies while straddling them over at least a portion of their height.

Preferably, at least one assembly is connected at one of its end faces to an output terminal through an output connector and an additional electrical insulation member, made of an electrically insulating material and including a bottom and a rim extending essentially perpendicularly to the bottom and surrounding it, is placed on the end face of the assembly connected to the output terminal so that the bottom is parallel to the end face and the rim runs along the side wall of the assembly while straddling it over at least a portion of its height Preferably, an insulating plate is interposed between at least one bar or an output connector and the associated electrical insulation member.

Figure 2:
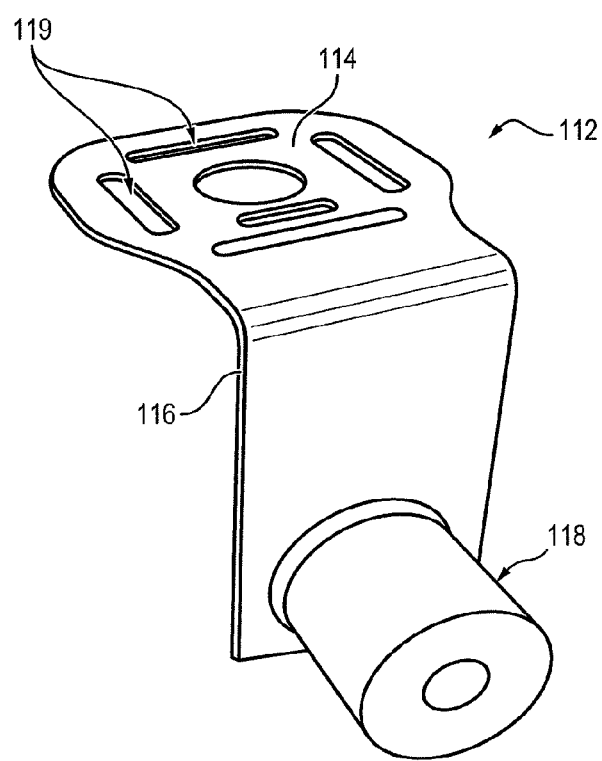

A non-limiting example of a module according to an embodiment of the invention will now be described, with the help of the drawings wherein:

FIG. 1 shows a perspective and an exploded view of a module according to this embodiment, FIG. 2 is a perspective view of the output connector of the module according to this embodiment.

As can be seen in FIG. 1, the module 10 includes a shell 12 wherein are accommodated energy storage assemblies 100. This shell includes two upper 14 and lower 16 walls, as well as a side wall 18 made of several assembled portions. The walls are made in particular of a metallic material such as aluminum.

Each assembly 100 includes a housing 102 containing an energy storage element and an electrolyte by which the energy storage element is usually impregnated.

The element is for example a coil consisting of complexes and separators jointly rolled into a spiral to form the coil. By "complex" is meant, within the scope of the present invention, a stack including at least two layers, particularly two layers of electrodes designed to form the positive and negative electrodes of the complex.

The housing includes a body 104 or tubular element, of cylindrical shape and including a side wall. The axis of the tubular element 104 corresponds to the longitudinal axis of the assembly. The tubular element is open at both of its ends. Alternatively, it can also include a bottom at one of its ends and be open at its other end to allow insertion of the storage element into the shell. In this case, the outer face of the bottom is preferably substantially planar, to allow the welding of a bar at any point on its surface. It can also have a shape other than cylindrical, particularly parallelepiped. It is however preferably symmetrical relative to the longitudinal axis of the assembly.

Each open end of the body, here the two ends of the body, is closed by a cover 106. Each cover 106 includes a covering wall to close the open end of the body 1. This covering body includes two faces:
- an inner face designed to be connected to the energy storage element, and
- an outer face designed to be connected, particularly by welding, to a conducting bar 110, the role and configuration whereof will be detailed hereafter.

Preferably, the outer face of the cover is substantially planar. More precisely, this outer face is preferably free of pins in its center and of edges at its periphery. This makes it possible to maximize the surface area of the cover that can be welded to the bar. The welding latitude of the bar in the cover is thus increased, the position of the bar being able to vary rather considerably relative to the position of the assembly onto which it is welded, as will be described in more detail hereafter. The invention can however be made with an assembly including a pin on its outer face situated at at least one of its ends. The outer face of the cover constitutes the end face of the assembly.

The covering wall of each of the covers constitutes a terminal of the assembly, respectively positive and negative, electrically connected to the electrodes of the same sign of the assembly, respectively positive or negative. To ensure proper operation of the assembly, the covers are of course insulated one from the other, particularly by seals positioned between the cover 106 and the tubular element 104.

Each cover can also include a skirt 108 on the periphery of the covering wall, this skirt being designed to partially cover the side wall of the shell by surrounding it over one portion of its height.

Advantageously, the housing 102, particularly its body 104, can include a bellows located particularly at the side wall. This bellows, not shown in the figures, makes it possible to vary the height of the assembly so as to compensate for possible variations in height of the different assemblies, linked in particular to the manufacturing tolerances of the various parts or to assembly clearances resulting from their assembly.

It will be noted that the assemblies are positioned side by side in the module so that their longitudinal axes are aligned and their end faces are substantially parallel to the upper and lower walls 14, 16 of the shell of the module.

As indicated previously, the assemblies of the module are connected two by two at their upper and lower ends using bars 110. Thanks to these bars, the assemblies are electrically connected in series. In other words, the negative terminal of an assembly is connected to the positive terminal of an adjoining assembly and its positive terminal is connected to the negative terminal of another adjoining assembly.

More precisely, with the exception of the two end assemblies labeled 100A, 100B in FIG. 1, each assembly includes a first end face connected by a first conducting bar 110 to an end face of a first adjoining assembly and a second end face connected by a second conducting bar 110 to an end face of a second adjoining assembly, distinct from the first. Regarding the two end assemblies 100A, 100B, they are connected at a first end face by a bar 110 to an end face of an adjoining assembly. However, at their opposite end face, they are connected to an output terminal 118 through an output connector 112 with a particular shape and visible in FIG. 2. On the module of FIG. 1, a connector such as 112 is positioned on the end faces located at the bottom end of the end assemblies 100A, 100B.

Each bar 110 is for example a plate substantially planar extending longitudinally. It includes in particular a first portion superimposed on a first assembly and a second portion superimposed on a second assembly, transverse thinning being provided between the two portions. The bar 110 can be welded by any means onto the end face of the cover, particularly by LASER welding or by FSW welding, as is known.

It could also be composed for example of portions with different stiffnesses, even if that is not essential to accomplish the invention. In particular, each bar can include:
- two rigid portions, each being designed to be put into contact with a respective cover of two adjoining storage assemblies,
- a deformable portion between the two rigid portions.

The presence of a deformable portion on the bar makes it possible to facilitate its deformation by folding without breakage with the goal of its connection to the assembly, particularly by guaranteeing the support of the bar on the assemblies even if their heights are different. This makes it possible to guarantee the quality of the connection. This is particularly advantageous in the case where the connection of the bar to the assembly is accomplished by welding, particularly LASER welding, because an intimate contact is necessary to effectively accomplish a weld using this technology.

The difference in stiffness of the different portions constituting the bar can be obtained by a longitudinal variation in the thickness of the plate. In particular, the deformable portion can be a thinned portion with a smaller thickness than the thickness of the rigid portions. It can also be accomplished by means of a fold or a deflection of the central portion of the bar. The bar can also be made of a plurality of superimposed sheets, interconnected in particular by welding at each of their ends, or of a plurality of wires braided together to form the bar, which also confers good flexibility to the bar in the areas where it is not connected to the assemblies.

The output connector 112, for its part, is shaped like an L, including a first wall 114 designed to be positioned on and welded to the end face of an assembly, and a second wall 116 essentially perpendicular, directed toward the end face of the assembly and including, on one face designed to be oriented toward the outside when the connector is placed on the assembly, an essentially cylindrical output terminal 118 protruding from the second wall of the connector 112. The output terminal is designed to engage in an orifice 20 of the side wall of the shell of the module.

As can also be seen in FIG. 2, the output connector 112 or the bar 110 can include thinned areas 119 on the portion designed to be positioned on an assembly to facilitate welding of the connector or of the bar to the assembly, welding being carried out at these thinned areas of the bar.

The module also includes a plurality of electrical insulation members 120, one member being associated with one conducting bar 110. Each insulation member 120 includes, for this purpose, a bottom 122 and a rim 124 surrounding the bottom and is fitted on the end faces of the assemblies connected by the bar. In reality, it is superimposed on the bar 110 which connects the assemblies. The bottom 122 is thus parallel to the end faces of the assemblies and to the associated bar while the rim 124 is formed to surround the side walls of the two assemblies over a portion of their height and is in particular dimensioned to cover the skirt 108 of the cover of each of the assemblies. The insulating member 120 has a complementary shape to the two assemblies connected by the bar 110 so that the rim 124 runs along the skirt 108 of the covers of said assemblies. As can be seen in FIG. 1, the insulation members are associated with each bar of the module and are therefore positioned at the upper and lower ends of the assemblies, but such members could be associated only with certain bars (1 in 2 for example), which would still make it possible to insulate the assemblies from one another.

The module also includes two additional electrical insulation members 130 respectively associated with each output connector 112. These members also include a rim 134 and a bottom 132 and are superimposed on the first wall of the output connector 112, and on the corresponding end face of the assembly 100A, 100B. It also forms a bowl delimiting a recess wherein the assembly is accommodated. The members 130 are therefore formed so that the rim surrounds only one assembly 100A, 100B and not two coupled assemblies. The rim is formed to run along the side wall of the assemblies and is also formed to run along the outer face of the second wall of the output connector 112 and includes for this purpose a small deflection 136, as is shown in FIG. 1. The rim 134 of this output connector 112 has a height chosen to cover the skirt 108 of the cover of each of the assemblies 100A, 100B but not, however, the output terminal 118 so as not to hinder its positioning in the opening 20 of the shell 12.

Each of the insulating members 120, 130 is made of plastic, particularly of thermoplastic such as polypropylene. It can in particular consist of a film of polypropylene that is fairly thin, approximately 250 microns for instance, and thermoformed.

As can also be seen in FIG. 1, an insulation plate 140, 142 is inserted between each bar 110 or output connector 112 and the associated electrical insulation member 120, 130, in the lower portion of the module. This insulation plate is made in a thermally conducting and electrically insulating material, such as EPDM. In the embodiment, it is placed only at the lower end of the module, which constitutes the heat rejection face of the module, but such an insulation plate could also be placed between the bars or connectors and the associated member in the upper part of the module.

Each of these plates 140, 142 is formed to adopt the shape of the bottom of the member 120 or 130 and also that of the associated bar or connector. It makes it possible to improve electrical insulation while directing the heat generated by the assemblies toward the outside of the module. Its thermal action is more effective inside the electrical insulation member than outside because it is a better conductor than the material used to make the electrical insulation member. Moreover, placing it inside the member makes it possible to save material constituting this plate (relative to an outside arrangement of the plate). The presence of this plate 140, 142 also makes it possible to avoid micro-discharges between the assemblies and the electrical insulation member.

The module also includes, to complete the insulation between the assemblies 100 and the shell 12, a strip of insulating foam 22 rolled around the assemblies of the side wall 18 of the shell so as to electrically insulate the assemblies from the side walls 18 of the shell. Insulating foam can also be glued to the upper wall 14 of the shell, at the inner face of said wall, even if that is not necessary.

Said side walls 18 also hold at least one electronic card 24 on an inner face. Said card is electrically connected to the assemblies by cables not shown in the figures and makes it possible in particular to carry out balancing of the assemblies so that they discharge as homogeneously as possible.

The module also includes reinforcements 26 consisting of essentially vertical bars and designed to be positioned between the assemblies 100, said bars 26 connecting the upper 14 and lower 16 walls of the module so as to reinforce the mechanical strength of the module.

A method of manufacture of the module as shown in FIG. 1 will now be described. First of all, pairs of assemblies 100 are formed and these assemblies are connected two by two by welding using conducting bars. The same is done by welding the output connectors 112 to two isolated assemblies 100A, 100B.

The insulation plates 140 are then positioned in the insulation members 120, 130 so that the plate 140 is placed in the recess and surrounded by the rims 124, 134 of the member wherein it is placed. The plate has previously been cut out so as to have a shape identical with the bottom of the member 120, 130.

The member 120 equipped with the plate 140 is then positioned on the pairs of assemblies connected by the bar 110 so as to be superimposed on the bar 110 with the rims 124 partially straddling the side walls of the assemblies while the member 130, also equipped with a plate 142, is positioned on the isolated assemblies equipped with the output connector 112 so as to be superimposed on the output connector, with the rims 134 partially straddling the side wall of the assembly.

The assemblies equipped with insulation members are then turned over and they are positioned side by side on one wall 16 of the shell forming the lower wall, the assemblies 100A, 100B occupying favored positions so that the output terminal of the assembly is facing the opening 20 of the side wall 18. Alternatively, the assemblies are positioned side by side and the wall 16 is installed on these assemblies and the combination of these different elements is turned over.

The bars 110 are then welded to the upper faces of the coupled assemblies so that each of the assemblies already connected to an adjoining assembly by a bar at its lower end face is connected to another assembly adjoining assembly at its upper end face, which makes it possible to electrically connect all the assemblies in series between the output terminals 118 of the module. The electrical insulation members 120 are also positioned at the upper face of the assemblies, so that one member 120 is associated with each bar 110. Before welding the bars, it has also been possible to carry out a step of pre-positioning the output terminals relative to the side wall 18 and the openings 20.

The assemblies are then surrounded with a strip of foam 22 and the reinforcements 26 are placed in the module. Finally, the side walls 18 on which the various elements that they carry have been pre-mounted (electronic card 24, fluid-tight seal with respect to the opening 20 for accommodating the output terminals) are positioned. Finally the walls 14, 16, 18 of the module are assembled and the reinforcements 26 are attached, for example by screwing them to the upper and lower walls of the shell.

The module according to this embodiment of the invention thus makes it possible to reduce the costs of manufacture relative to the module while still ensuring good electrical insulation for the module between the assemblies and between the assemblies and the shell of the module.

The module according to the invention could include many variants relative to what has been described using the figures, these variants still being included in the scope of the claims. For example, the shape of the assembly, of the connector and of the bar is not limited to what has been described. Moreover, an insulation member is also not necessarily associated with each of the bars and each of the connectors. It will also be noted that the insulation plate could not be combined with the insulation member depending on the material selected for this member. It could also be situated between the insulation members and the shell of the module. The walls of the shell could also be formed in another way, several walls being contiguous for example. The reinforcements are also optional, as well as the foam strip and the electronic card. These last elements could also be configured in another way that what is presented in FIG. 1.

The invention claimed is:

1. An energy storage module (10) comprising a plurality of energy storage assemblies (100) positioned side by side, and a rigid shell (12) designed to surround the storage assemblies, each assembly including at least one side wall closed at each end by an end face, wherein the storage assemblies are electrically connected two by two by conducting bars (110) extending over at least one end face of each assembly, the bars being arranged so that one bar connects a first end face of at least one predetermined assembly to an end face of a first adjoining assembly and that a second bar connects a second face of the predetermined assembly to an end face of a second adjoining assembly, wherein the module also includes at least one electrical insulation member (120), made of an electrically insulating material and including a bottom (122) and a rim (124) extending essentially perpendicularly to the bottom and surrounding it, each electrical insulation member (120) being associated with one bar (110) and fitted to the end faces of the two adjoining assemblies connected by the bar so that the bottom is parallel to the end faces and the rim runs along the side walls of the two assemblies while straddling them over at least a portion of their height, and wherein a plate (140, 142) made of a thermally insulating material, is interposed between the bar (110) or the output connector (112) and the associated electrical insulation member (120, 130).

2. The module according to claim 1, including at least one assembly (100A, 100B) connected at one of its end faces to an output terminal (118) of the module by an output connector (112), the module further comprising at least one additional electrical insulation member (130) associated with the output connector (112), made of an electrically insulating material and including a bottom (132) and a rim (134) extending essentially perpendicularly to the bottom and surrounding it, the electrical insulation member being fitted on the end face of the assembly connected to the output terminal so that the bottom is parallel to said end face and that the rim runs along the side wall of the assembly while straddling it over at least a portion of its height.

3. The module according to claim 2, wherein the output connector (112) is configured in the shape of an L, a first wall (114) of the connector running along the end face of the assembly and a second perpendicular wall (116) bearing the output terminal (118), the additional electrical insulation member (130) being configured to surround the assembly and the output connector so that its rim (134) runs along the side wall of the assembly and the second wall of the connector.

4. The module according to claim 3, wherein the rim (134) of the additional electrical insulation member is configured so that it does not straddle the output terminal (118).

5. The module according to claim 1, including a total number of electrical insulation members (120, 130) greater than half the number of storage assemblies (100) of the module.

6. The module according claim 1, wherein the or at least one of the electrical insulation members (120, 130) is made of thermoplastic material.

7. The module according to claim 1, wherein the plate (140, 142) is made of EPDM.

8. The module according to claim 1, wherein at least one assembly includes a tubular element (104) including the side wall(s) and open at at least one of its ends, and a cover (106) forming an end face of the assembly and closing the, or one end of the tubular element.

9. The module according to claim 8, wherein the cover (106) includes a wall forming the end face and a skirt (108) surrounding said wall and surrounding the side wall(s) of the tubular element, the rim (124, 134) of the electrical insulation member having a height greater than or equal to the height of the skirt of the cover of the assembly.

10. The module according to claim 1, including a total number of electrical insulation members (120, 130) equal to the number of assemblies of the module, plus 1.

11. The module according to claim 1, wherein the or at least one of the electrical insulation members (10, 130) is made of polypropylene.

12. A method for manufacturing an energy storage module (10) comprising a plurality of energy storage assemblies (100) positioned side by side, and a rigid shell (12) designed to surround the storage assemblies, each assembly including at least one side wall and closed at each end of the side wall by an end face, the method comprising the following steps:

the storage assemblies (100) are electrically connected two by two by conducting bars (110) extending respectively over at least one end face of each assembly, so that one bar connects a first end face of at least one predetermined assembly to a first adjoining assembly and a second bar connects a second face of the predetermined assembly to a second adjoining assembly, at least one electrical insulating member (120), made of an electrically insulating material and including a bottom (122) and a rim (124) extending essentially perpendicularly to the bottom and surrounding it, is placed on the end faces of the two adjoining assemblies connected by the bar so that the bottom is parallel to the end faces and the rim runs along the side walls of the two assemblies while straddling them over at least a portion of their height, wherein an insulation plate (140, 142) is interposed between at least one bar (110) or an output connector (112) and the associated electrical insulation member (120, 130).

13. The method according to claim 12, wherein at least one assembly (100A, 100B) is connected at one of its end faces to an output terminal (118) of the module through an output connector (112) and an additional electrical insulation member (130), made of an electrically insulating material and including a bottom (132) and a rim (134) extending essentially perpendicularly to the bottom and surrounding it, is placed on the end face of the assembly connected to the output terminal so that the bottom is parallel to the end face and the rim runs along the side wall of the assembly while straddling it over at least a portion of its height.

* * * * *